(12) United States Patent
Neal et al.

(10) Patent No.: US 6,864,043 B2
(45) Date of Patent: *Mar. 8, 2005

(54) APODIZED MICRO-LENSES FOR HARTMANN WAVEFRONT SENSING AND METHOD FOR FABRICATING DESIRED PROFILES

(75) Inventors: Daniel R. Neal, Albuquerque, NM (US); Justin D. Mansell, Palo Alto, CA (US)

(73) Assignee: WaveFront Sciences, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/673,569

(22) Filed: Sep. 30, 2003

(65) Prior Publication Data

US 2004/0060903 A1 Apr. 1, 2004

Related U.S. Application Data

(63) Continuation of application No. 09/612,223, filed on Jul. 7, 2000, now Pat. No. 6,656,373.
(60) Provisional application No. 60/142,918, filed on Jul. 9, 1999.

(51) Int. Cl.$^7$ .................................................. G03F 7/00
(52) U.S. Cl. ...................... 430/320; 430/322; 430/323
(58) Field of Search ................... 430/320, 322, 430/323, 324

(56) References Cited

U.S. PATENT DOCUMENTS

| | | | |
|---|---|---|---|
| 3,808,035 A | 4/1974 | Stelter | 427/74 |
| 4,327,129 A | 4/1982 | Sepp | 427/164 |
| 5,186,975 A | 2/1993 | Tizabi et al. | 427/99 |
| 5,367,588 A | 11/1994 | Hill et al. | 385/37 |
| 5,460,908 A | 10/1995 | Reinberg | 430/5 |
| 5,509,556 A * | 4/1996 | Balz et al. | 216/56 |
| 5,534,312 A | 7/1996 | Hill et al. | 427/533 |
| 5,691,116 A | 11/1997 | Revelli et al. | 430/321 |
| 5,814,803 A | 9/1998 | Olmstead et al. | 235/462.01 |
| 5,853,960 A | 12/1998 | Tran et al. | 430/321 |
| 5,972,794 A | 10/1999 | Katakura | 438/704 |
| 6,656,373 B1 * | 12/2003 | Neal et al. | 216/26 |

* cited by examiner

*Primary Examiner*—Kathleen Duda
(74) *Attorney, Agent, or Firm*—Volentine Francos & Whitt, PLLC

(57) ABSTRACT

An optical element which controls both the phase and irradiance distribution, thereby completely specifying the E-field, of light, allowing completely arbitrary control of the light at any plane. Such an optical element includes a portion that controls the phase and a portion that controls the irradiance. The portion that controls the irradiance is an apodized irradiance mask having its transmission varying with position in a controlled fashion. This apodized irradiance mask is preferably a pattern of metal. In order to insure a smoothly varying pattern of metal with minimized diffraction effects, a very thin mask spaced from a substrate is used to provide the metal on the substrate. The apodized irradiance mask may be placed directly on the phase control portion, or may be on an opposite side of a substrate of the phase controlled portion.

36 Claims, 7 Drawing Sheets

FIG. 8B
RADIAL INTENSITY PATTERN OF APODIZED LENSES FOC#

FIG. 8A
RADIAL INTENSITY PROFILE OF UNAPODIZED LENSES

US 6,864,043 B2

APODIZED MICRO-LENSES FOR HARTMANN WAVEFRONT SENSING AND METHOD FOR FABRICATING DESIRED PROFILES

CROSS-REFERENCE TO RELATED APPLICATIONS

This is a continuation of U.S. patent application Ser. No. 09/612,223 filed 7 Jul. 2000, now U.S. Pat. No. 6,656,373, and claims the priority benefit under 35 U.S.C. § 119 of U.S. Provisional Application No. 60/142,918 filed 9 Jul. 1999, the entirety of each of which is hereby incorporated by reference for all purposes as if fully set forth herein.

BACKGROUND OF THE INVENTION

1. Field of the Invention

The present invention is directed to methods of fabricating profiles of varying transmission, more specifically to creating apodized apertures for use in wavefront sensing and the apertures created thereby.

2. Description of Related Art

Hartmann type wavefront sensors measure the spot positions of light diffracted from an array of apertures to determine the shape of an optical wavefront impinging on the aperture array. The original Hartmann sensor used diffraction from hard apertures put into an opaque screen or plate. The demand for high photon efficiency for some applications required the screen be replaced with an array of lenses, forming a Shack-Hartmann wavefront sensor. The advent of micro-optics allowed small high quality arrays to be fabricated.

Currently, Hartmann-type sensors are used for optical meteorology and laser characterization. Lenses for the Shack-Hartmann wavefront sensor have fairly long focal lengths, since this improves the sensitivity of the sensor to phase tilt by increasing the moment arm and spreading the focal spot over many pixels on a CCD which provides better centroid accuracy. These slow, i.e., large f-number, lenses create large diffraction patterns. A diffraction pattern from an individual lens in the detection plane spreads into the area behind neighboring lenses and creates crosstalk. Coherent sources of radiation exacerbate the crosstalk through interference.

Diffraction plays an important role as well in many different types of optical systems. It plays a critical, limiting role in astronomy, for example. With the advent of large, accurate telescopes that are either space-based, or ground-based but using adaptive optics, it is possible to optically resolve planets in orbit around nearby stars. However, these planets would have very little angular separation from the star, and would appear much dimmer. To block the light from the star a small obscuration disk can be placed at an intermediate image plane in the telescope. However, diffraction from the edges of this obscuration would swamp the image of a planet.

Furthermore, diffraction plays a key role in any light propagation or manipulation. As light propagates, either in free space or through a media, both the phase and irradiance distributions affect its state. There are currently a number of means for controlling the phase state of the light. This can be accomplished through a lens, mirror, phase plate or other optical element. In fact, elements can be fabricated to create arbitrary phase states. However, it is currently not possible to control the irradiance state of the light. If both can be controlled together, then the complete E-field of the light has been specified and hence completely arbitrary control of the light at any plane is possible.

SUMMARY OF THE INVENTION

It is therefore an object of the present invention to provide a Hartmann wavefront sensor that overcomes one or more of the problems due to the limitations and disadvantages of the related art. More particularly, it is an object of the present invention to reduce crosstalk in the sensor.

It is further an object of the present invention to be control both the phase and irradiance distribution, thereby completely specifying the E-field of the light, allowing completely arbitrary control of the light at any plane.

It is a further object of this invention to provide for a means of masking, reflecting or blocking light so as to obscure some regions without introducing diffraction rings or other features. It is an object to provide softened apertures and masks that minimize or control the effects of diffraction.

It is a further object of this invention to control the irradiance distribution of light in an arbitrary fashion. Combined with existing means for controlling the phase, it is an object of the invention to provide complete control of the E-field of the light.

These and other objects may be realized by applying an apodized irradiance mask to a lens or substrate such that the transmission of the optical element varies with position in a controlled fashion. For some applications, this mask may be a super-gaussian.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

While conventional optical elements control the phase of light, typically irradiance has only been controlled at the edges, e.g., using hard or soft apertures. If an optical element could be constructed that could control both phase and irradiance, any desired wavefront could be created. In accordance with the present invention, an apodized irradiance mask is provided to a lens or substrate such that the transmission of the optical element varies with position in a controlled fashion. For some applications, such as reducing crosstalk in a lenslet array, this mask may be a super-gaussian.

Figure 1:
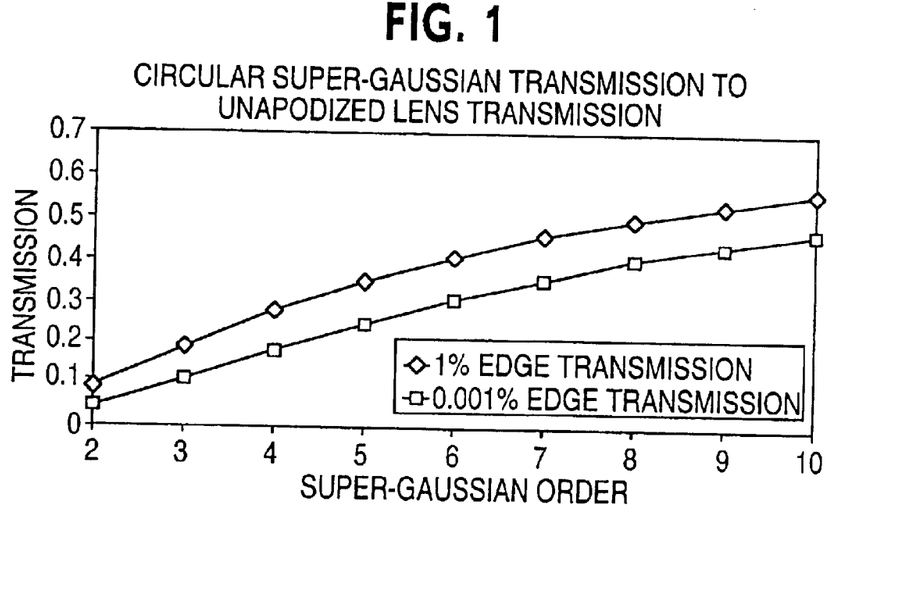
FIG. 1 are plots of the transmission ratio of a super-gaussian apodized circular lens to an unapodized circular lens for different levels of edge transmission.

A super-gaussian is mathematically identical to a gaussian except that the argument of the exponential is raised to a higher power. A normal gaussian is a second order super-gaussian. By placing a super-gaussian intensity profile on a square lens such that the edge of the square lens has 0.1% transmission throws away quite a bit of light through either reflection or absorption. FIG. 1 plots the ratio of light transmitted for various orders of super-gaussian compared to light transmitted for an unapodized circular lens. From FIG. 1, it is evident that the transmission increases with an increase in order. The low transmission is not acceptable for some applications, e.g., astronomical applications where photons are scarce, but for optical metrology and laser characterization, where photons are plentiful, this loss is acceptable.

Figure 2:
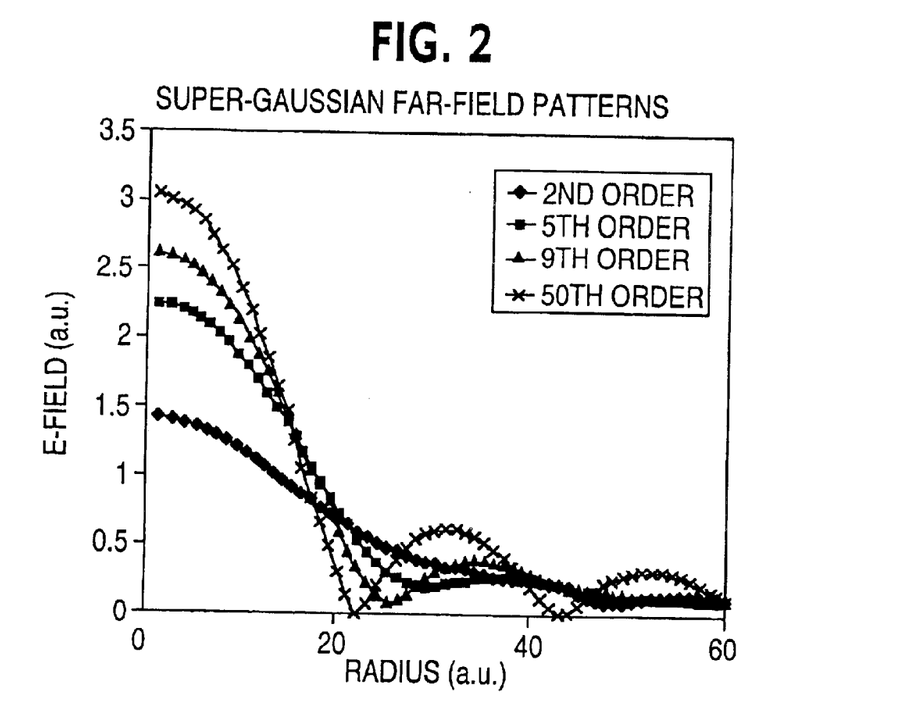
FIG. 2 are plots of super-gaussian far-field patterns for different orders.

FIG. 2 illustrates the far-field patterns for various super-gaussian distributions. From these distributions it appears that super-gaussians beyond the fifth order have too much ringing, i.e., the secondary maxima occur too close to the primary maximum and the peaks are too high, increasing crosstalk. Thus, if low transmission is acceptable, the fifth order gaussian may be employed to increase transmission while decreasing crosstalk.

To demonstrate the relative crosstalk between apodized and unapodized lenses, an array of lenses with different far-field diffraction patterns was modeled. The focal plane was modeled by coherently adding an array of far-field diffraction patterns. To model the CCD, the intensity measured by each pixel was determined by summing one hundred intensity points evenly distributed over that pixel. The intensity was then digitized to a set number of bits. The spot position was determined using the centroid, which is the sum of the intensity times the position for a given pixel divided by the sum of the intensity. To eliminate the fluctuations in the intensity outside the main focal spot, the intensity was thresholded by subtracting a value from the intensity measured at each pixel and zeroing the intensities below zero. For square lenses, a unitless parameter called the lens order can be used to characterize the diffraction. The lens order is the lens diameter (length of a square side) divided by the focal spot radius. This parameter gives insight into the two competing factors in centroid accuracy, spot size and diffraction interference. A large lens order means small spots which reduce centroid accuracy by reducing the number of pixels that see the spot, but increases the centroid accuracy by reducing the crosstalk between adjacent lenses. A large lens order also reduces the focal length which affects the sensitivity of the wavefront sensor. The lens order is identical to the Fresnel number for a lenslet.

A variety of square lens arrays with one hundred lenses were analyzed by evaluating the centroid of the focal spot in the fifth row and column of the array and moving the position of the focal spot adjacent to it. By measuring the motion of the centroid, the crosstalk can be illustrated. For this particular analysis, there were one hundred pixels per square lens, a square pixel site of 10 microns, a threshold of 10%, twelve bits of digitization, and a wavelength of 633 nm.

Figure 3:
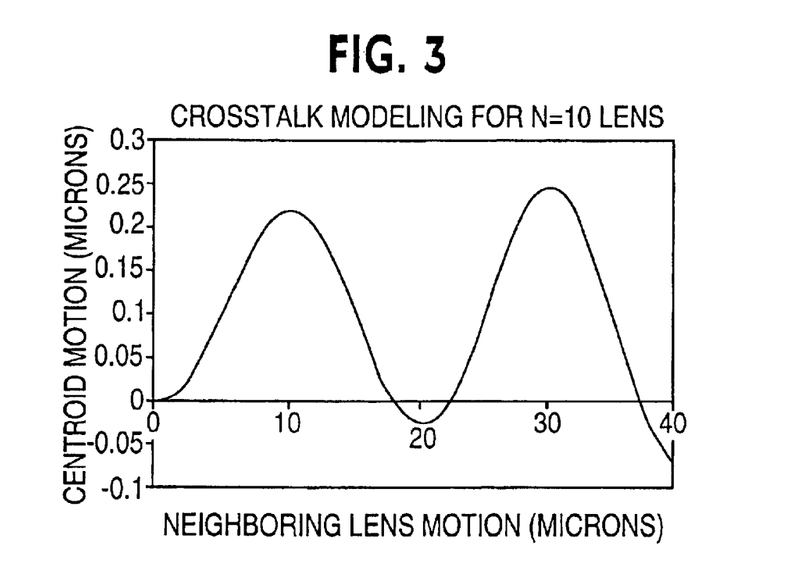
FIG. 3 is a curve representing crosstalk from neighboring lens focal spot motion on a lens array with a diffractive order of ten.
Figure 4A:
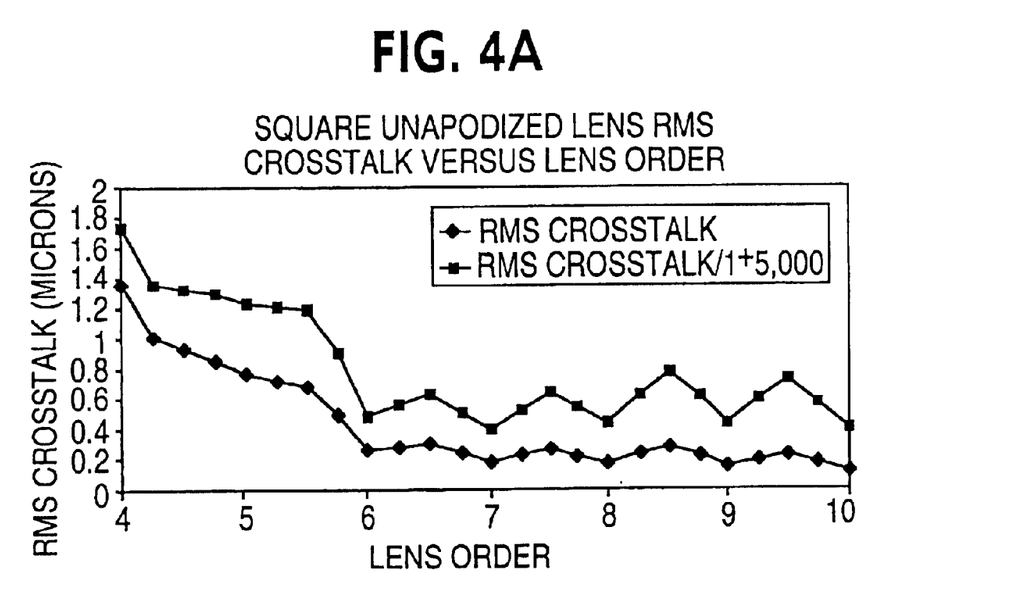
FIG. 4A are plots of RMS crosstalk for unapodized lenses of various lens orders with 10% thresholding applied to the intensity profile.

FIG. 3 shows the motion of a centroid with respect to the motion of the neighboring lens focal spot for a lens order of ten, with the light having an electric field distribution of a sinc function. The sinc intensity profile tracing across the neighboring lens can be easily seen in this plot. To get an idea of the optimum lens order for this particular example, the RMS error was determined for a variety of lens orders for motion from the center to the point where the adjacent focal spot reaches the edge of its lens. FIG. 4A shows the RMS error with respect to various lens orders for 10% threshold. From this plot, it can be seen that the optimum lens design is about seven, since beyond this point the focal length begins to be too large, but before this point, the crosstalk is too large.

Figure 4B:
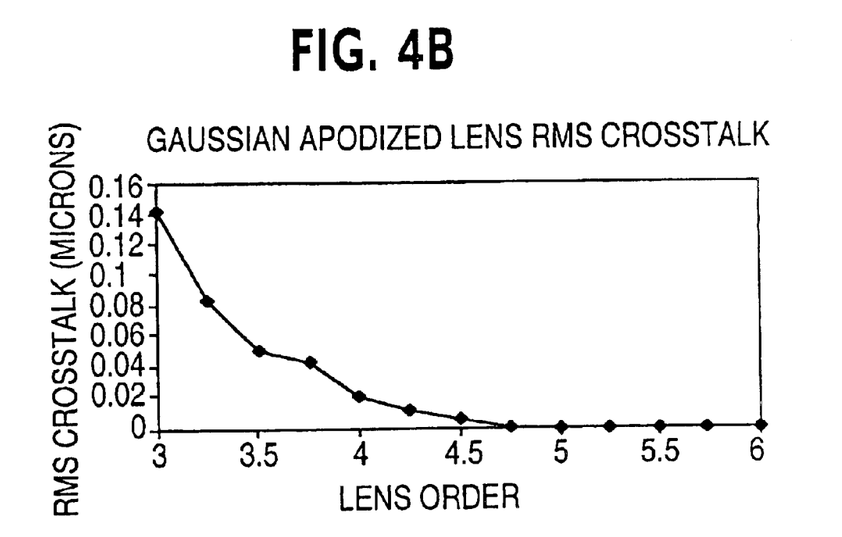
FIG. 4B are plots of RMS crosstalk for gaussian apodized lenses of various lens orders with 10% thresholding applied to the intensity profile.

FIG. 4B shows the RMS error for apodized lenses of various lens orders for which a second order super-gaussian intensity profile was used with a waist equal to the spot radius of the square lenses, which use of the lens order parameter defined above. In reality, the focal length would have to be different between the gaussian intensity profile lens and the square lens to make the waist equal to the square lens spot radius, but this is a minor factor which will not be considered here. No crosstalk could be measured for small motions of the adjacent focal spot until enough of the gaussian profile leaks into the adjacent lens. Beyond a lens order of six, no crosstalk could be measured because the shifts in the intensity profile were less than the twelve bit digitization used. Therefore, it is evident that the gaussian apodization significantly reduces crosstalk.

To create an effective apodization, the optical density variation of the material needs to be at least two. One way to realize the required optical density is to deposit metal. The higher the density of the holes in the mask, the thicker the metal deposited thereon. The apodization pattern may be provided directly on a lens or just on a substrate.

Figure 5A:
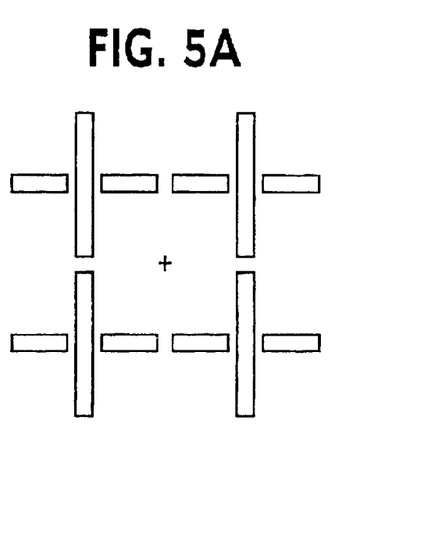
FIGS. 5A and 5B are examples of mask patterns used to create holes for evaporation apodization in accordance with one embodiment of the present invention.
Figure 5B:
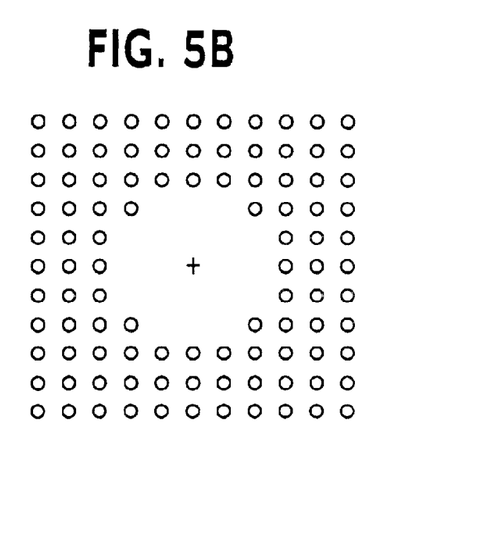

Examples of apertures used to provide this gaussian apodization are shown in FIGS. 5A and 5B. The pattern in FIG. 5A is a cross pattern to be formed at the edges of the lens. The widths of the lines forming the crosses are preferably between 120 and 200 microns. The pattern shown in FIG. 5B is a hole array of, e.g., 60 micron diameter holes on a 120 micron grid. These holes are only outside a given radius so the center of the circle will have high transmission and the edges would have lower transmission. This pattern is designed to achieve the desired transmission distribution by varying the hole size or distribution as a function of position. The holes are preferably created with computer generated, e-beam or laser written masks that are transferred to the substrate by a lift-off process.

While binary masks of various shapes may be used to create the apertures, diffraction from the hard edges of the masks may spread light around in the focal plane. Preferably, an alternative technique such as a variable reflectance mirror (VRM) formed by evaporating dielectric material onto a substrate with an obstruction between the dielectric source and the substrate. The resulting VRM has a smoothly varying radial transmission profile. Another alternative would be to make the holes using soft apertures, such as gray scale masks, rather than hard apertures. Finally, a mask of holes may have the image thereof blurred by spacing the mask a distance from the substrate.

In order to insure the metal has smoothly varying thickness, a mask used to control the deposition of the metal should be relatively thin, e.g., on the order of a micron. However, since it is also desirable to have the mask be positioned away from the substrate to create blurring, thereby mitigating diffraction effects, it is preferable to create a thin mask that can be positioned away from the substrate.

Figure 6A:
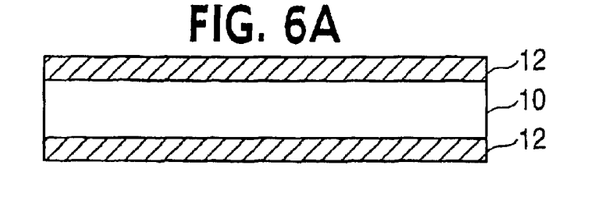
FIGS. 6A–6H schematically illustrate steps for creating apodized micro-lenses in accordance with the present invention.
Figure 6B:
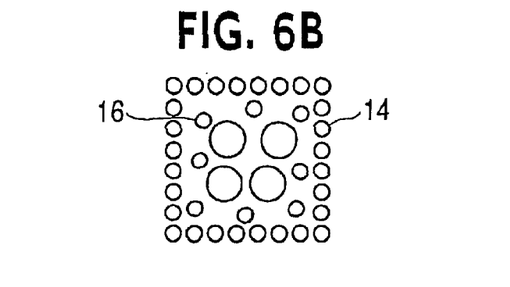
Figure 6C:
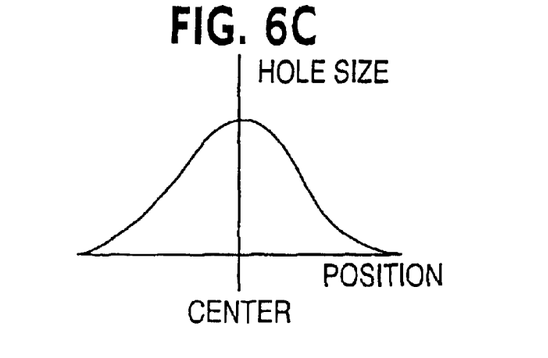
Figure 6D:
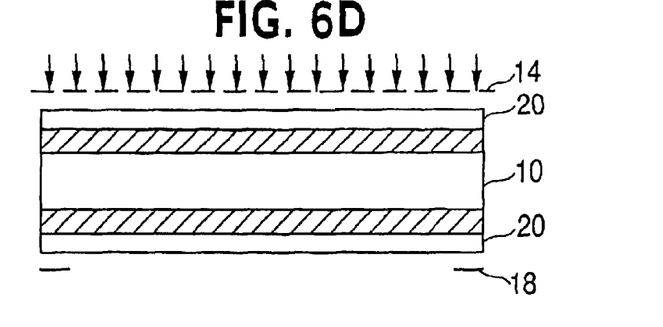
Figure 6E:
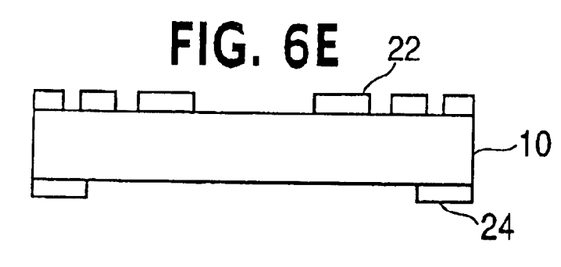
Figure 6F:
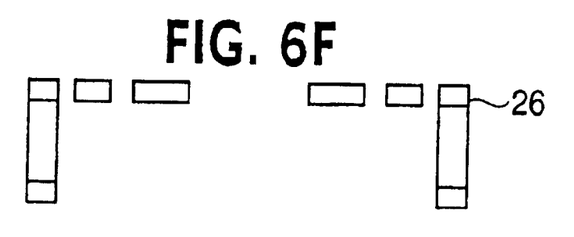
Figure 6G:
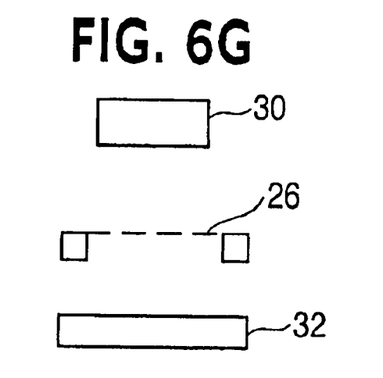

In one example shown in FIGS. 6A–6H, a material 30 having a different transmission coefficient than a substrate, i.e., a reflective or absorptive material, is evaporated through apertures held a distance from a substrate 32 as shown in FIG. 6G. To fabricate a mask for creating the apertures, a wafer 10, e.g., a silicon wafer, is coated with a layer of material 12 having different etch properties than the wafer, e.g., silicon nitride, on either side thereof, as shown in FIG. 6A. A mask 14 having holes 16 varying in hole size and/or distribution as a function of position, as shown in FIGS. 6B and 6C, is placed adjacent to one of the layers 12. A mask 18 for creating release patterns is placed adjacent to the layer 12 on the opposite side of the wafer 10. Before the placement of the masks 14, 18, the layers 12 are coated with a corresponding layer of photoresist 20. The photoresist 20 and layers 12 are then patterned using photolithography and plasma etching through their respective masks, as shown in FIG. 6D. An evaporation mask 22 is created on one side of the wafer 10 and release patterns 24 are created on the other side of the wafer 10. The release patterns 24 are, e.g., 1 cm squares that allow a silicon etchant, e.g., potassium hydroxide to release the membrane on the opposite side with the appropriate pattern for evaporation. Then the wafers are placed in a solution, e.g., 20 wt % KOH at 80 EC, to selectively remove the silicon and release the nitride membranes to create the evaporation mask 26, as shown in FIG. 6F. The release patterns 24 may also serve as spacing elements for the next processing step. The figures are not to scale and are for illustration purposes only.

The evaporation mask is then aligned with a substrate 32 on which the pattern of material 30 having a different transmission coefficient than the substrate 32, i.e., a reflective or absorptive material, is to be provided. For example, the material 30 may be nickel and the evaporation mask may be SiN. Nickel is preferable because a magnetic field may be during evaporation of the nickel through the evaporation mask 26 onto the substrate 32 to smooth any features of the sputtering target and eliminate pinhole camera effects from the use of small holes in the evaporation mask.

To achieve an acceptable intensity profile, the amount of nickel deposited and the distance between the mask and the substrate were adjusted. The separation of the mask and the substrate controls the spreading of the intensity pattern 34 created on the substrate 32. The amount of nickel deposited controls the maximum optical density. A layer of 200 nm of nickel creates enough stress on the silicon nitride membrane used to rupture it, thus defining the upper limit of the deposition thickness for this particular example. The metal intensity pattern 34 may be formed on a bare substrate, as shown in FIG. 6G, or may be formed directly on a phase controlling optical element.

Figure 7:
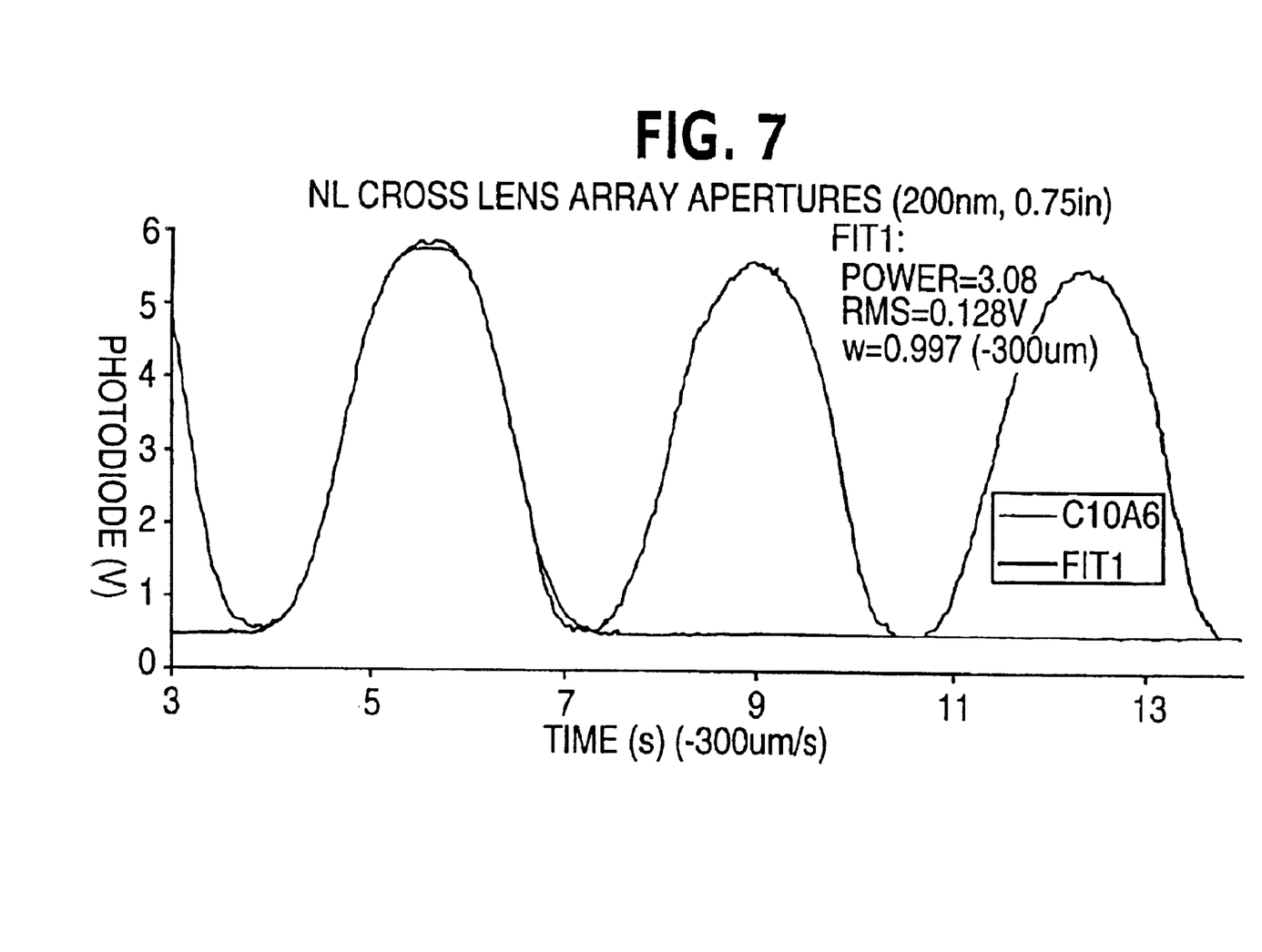
FIG. 7 is the intensity profile generated by the mask in FIG. 5A.

If the intensity pattern 34 is formed on a bare wafer, the intensity profiles of the aperture arrays may be measured before the lenses are formed on the wafer. To accomplish this, the wafer is scanned, e.g., through the focus of a helium neon laser at 633 nm using a motorized translation stage. A digitizing oscilloscope recorded the transmitted light as measured on a photodiode. The most successful run was for a separation of the water and mask of 0.75 inches and 200 nm of nickel deposited onto the mask. FIG. 7 shows the intensity profile generated by the cross pattern. The slow reduction in the peak-transmitted intensity is due to poor angular alignment during the scan. One profile was fit to a super-gaussian and determined to have a super-gaussian order equal to 3.08. The RMS fit error was only 0.126 volts out of a peak voltage of about 5.9V. The hole-array patterns produced similar smooth intensity profiles, but because of the amount of nickel transmitted through these masks, they did not achieve sufficient optical density to eliminate the ringing associated with the edges of the lenses.

Figure 6H:
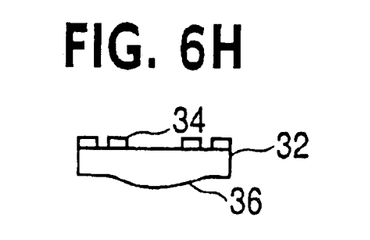

Preferably, an element 36 which controls the phase of the light, e.g., a microlens, is created on an opposite side of the substrate 10 from the intensity controlling pattern 34, as shown in FIG. 6H, in a conventional manner. For example, after the intensity controlling pattern is created using conventional techniques, such as binary masks, gray scale masks, reflow of photoresist. If the intensity controlling pattern 34 is to be provide directly on the element 36, this element 36 may be made in any conventional manner prior to the formation of the intensity controlling pattern.

The intensity profile of the focal plane was determined by imaging the focal plane of the lens under test onto a Cohu 2122 CCD with a 30 mm achromatic lens. A diode laser collimated with a shear plate was used as the light source. Because the important features of the intensity profiles were very low intensity, the dynamic range of the CCD had to be pushed using electronic shuttering of the camera. The CCD was adjusted to be in a linear regime by setting the shuttering to $1/10,000$ s and using the current knob on the diode laser and the gain knob on the CCD. Images were then taken with the shutter set at $1/10,000$ s, $1/4000$ s, $1/1000$ s and $1/250$ s. Although this procedure resulted in saturating the CCD in the focal spot, the diffracted wings remained unsaturated. Slices through the intensity profile were taken of the focal spots normal to the scanning direction of the CCD to prevent any effects of CCD blooming.

Figure 8A:
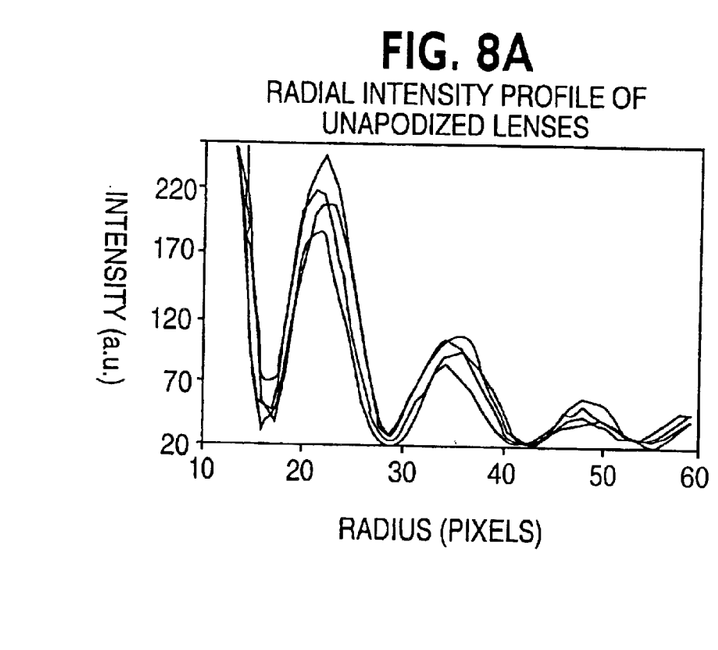
FIG. 8A is a plot of radial intensity profile of unapodized lenses.
Figure 8B:
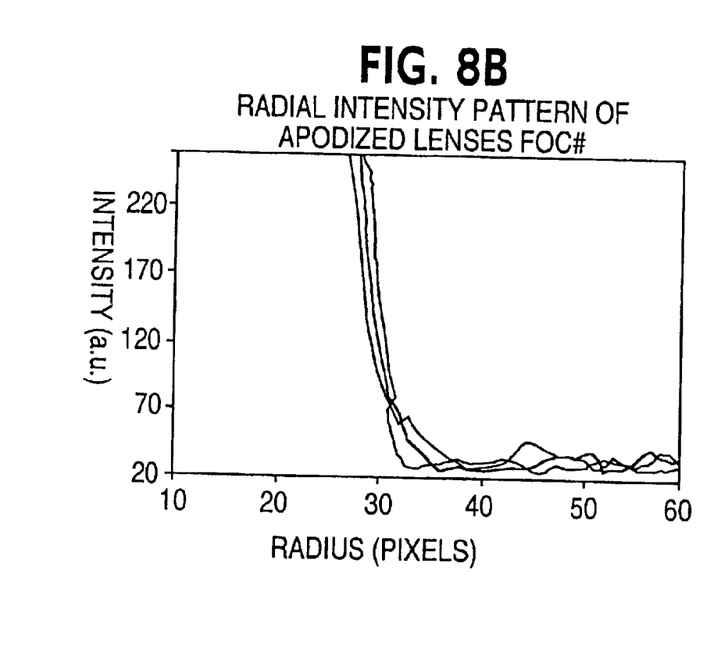
FIG. 8B is a plot of radial intensity profile of apodized lenses.

FIGS. 8A and 8B show the measured intensity profiles for $1/250$ s shuttering (40× amplification) for lenses of the same Fresnel number. The lenses shown in FIG. 8A without nickel profiles on them showed the classic circular-aperture diffraction profile. In contrast, the apodized lenses shown in FIG. 8B, which have a 3.08 super-gaussian aperture thereon exhibited no observable diffraction ringing.

While a method for fabricating an array of apodized apertures on an array of lenses for Shack-Hartmann wavefront sensing using integrated circuit technology has been presented, the method can be more generally applied to the fabrication of an optic capable of creating any desired intensity profile. This desired intensity profile may be combined with a desired phase profile to completely control the wavefront.

While the specific example illustrated in the detailed description is for a super-gaussian apodization, any desired controlled intensity variation may be realized in accordance with the present invention. For example, when blocking light to view an image off center, the pattern will have the most metal in the center, with the optical density of the material decreasing towards the opening to reduce diffraction effects.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method for fabricating optical density profiles on a substrate, comprising:
   providing a mask having a plurality of holes formed therein; and
   providing onto the substrate through the holes of the mask a material having a different transmission coefficient than the substrate, the material providing a desired optical density range, and the material also providing an apodization pattern on the substrate.

2. The method of claim 1 wherein providing the mask comprises:
   depositing a coating on a mask substrate,
   patterning the coating, and
   removing at least a portion of the mask substrate.

3. The method of claim 2 wherein the substrate is silicon.

4. The method of claim 2 wherein the deposited coating is silicon nitride.

5. The method of claim 2 wherein said patterning includes photolithographic processes.

6. The method of claim 2 wherein said patterning includes laser ablation.

7. The method of claim 2, wherein said removing includes etching.

8. The method of claim 7 wherein said etching includes using potassium hydroxide.

9. The method of claim 1, wherein the substrate is fused silica.

10. The method of claim 1, wherein said providing includes evaporating a metal.

11. The method of claim 1, further comprising, after said providing, fabricating a plurality of lenses on the substrate.

12. The method of claim 1, further comprising, before said providing, fabricating a plurality of lenses on the substrate.

13. The method of claim 12 wherein the material is provided on a same side of the substrate as the plurality of lenses are fabricated.

14. The method of claim 13, wherein the material is provided on the plurality of lenses.

15. The method of claim 1, wherein the substrate is reflective and the material is more absorbing than the substrate.

16. The method of claim 1, wherein the substrate is transmissive and the material is more reflective than the substrate.

17. The method of claim 1, further comprising spacing the mask from the substrate before said providing.

18. The method of claim 1, further comprising providing a phase controlling surface on the substrate.

19. The method of claim 1, wherein the material includes nickel.

20. The method of claim 1 wherein the mask provides Gaussian apodization to the arbitrary optical density profiles.

21. The method of claim 1, further including a step of spacing the mask a predetermined distance apart from a surface of the substrate prior to providing the material onto the substrate through the holes of the mask.

22. The method of claim 1, wherein the plurality of holes vary in size.

23. The method of claim 1 wherein the holes in the mask remain fixed in position relative to the substrate while the material is provided through the holes onto the substrate.

24. The method of claim 23, wherein the mask has a plurality of holes.

25. A method for fabricating an optically transmissive device, comprising:
   providing an optically transmissive substrate having a plurality of lenslets formed thereon; and
   depositing onto the optically transmissive substrate through a mask a material having a different optical transmission coefficient than the optically transmissive substrate, the deposited material providing apodized apertures on the substrate.

26. The method of claim 25, wherein each apodized aperture is aligned with a corresponding one of the lenslets.

27. The method of claim 25, wherein an intensity profile of the apodized apertures is Gaussian.

28. The method of claim 25, wherein depositing the material includes evaporating a metal.

29. A method of fabricating optical density profiles onto a substrate, comprising:
   providing a substrate;
   depositing onto the substrate a material having a different optical transmission coefficient than the substrate, the material being deposited to have formed therein on the substrate an array of apodized apertures.

30. The method of claim 29, wherein depositing the material includes evaporating the material through a mask having at least one hole therein spaced apart from the substrate.

31. The method of claim 29, wherein an intensity profile of the apodized apertures is Gaussian.

32. A method for fabricating optical density profiles on a substrate, comprising:
   providing a substrate;
   providing a mask having a plurality of holes formed therein, the mask being separated and spaced apart from the substrate by a fixed distance; and
   providing onto the substrate through the holes of the mask a material having a different transmission coefficient than the substrate, the material providing a desired optical density range on the substrate.

33. The method of claim 32, wherein the providing the material onto the substrate includes evaporating a metal.

34. The method of claim 32, wherein a density of the holes is non-uniform along a radial distance from a center of the mask.

35. The method of claim 32, wherein the mask and its holes are held in a fixed position relative to the substrate while the material is provided onto the substrate through the holes of the mask.

36. The method of claim 32, wherein the holes in the substrate are aligned with a pattern of the material deposited onto the substrate.

* * * * *